United States Patent [19]

Eldumiati

[11] 4,310,881
[45] Jan. 12, 1982

[54] CONDITIONAL TRANSFER CONTROL CIRCUIT

[75] Inventor: Ismail I. Eldumiati, Holmdel, N.J.

[73] Assignee: Bell Telephone Laboratories, Incorporated, Murray Hill, N.J.

[21] Appl. No.: 77,613

[22] Filed: Sep. 21, 1979

[51] Int. Cl.$^3$ ............................................. G06F 13/00
[52] U.S. Cl. ................................................... 364/200
[58] Field of Search ... 364/200 MS File, 900 MS File

[56] References Cited

U.S. PATENT DOCUMENTS

| 3,689,895 | 9/1972 | Kitamura | 364/200 |
| 3,978,453 | 8/1976 | Garziera | 364/200 |
| 3,980,991 | 9/1976 | Mercurio | 364/200 |

*Primary Examiner*—Joseph M. Thesz
*Assistant Examiner*—David Y. Eng

*Attorney, Agent, or Firm*—Richard B. Havill

[57] ABSTRACT

In a conditional transfer control circuit (10) for a controller (11) arranged for fetching instructions from a sequence of addresses wherein a list of instructions is stored, there is a circuit (25) for producing a first signal (C) representing a true or false condition resulting from executing an instruction in the list of instructions and a circuit (IRO) for producing applying a second signal (on lead 32 or 72) indicating whether control is determined by the first signal being true or by the first signal being false. An EXCLUSIVE NOR (or EXCLUSIVE OR) gate (30 or 70), responsive to the first and second signals, produces a condition transfer signal (on lead 18) that causes the controller to fetch a next subsequent instruction from an address other than the next subsequent address in the sequence of addresses wherein the list of instructions is stored.

13 Claims, 2 Drawing Figures

4,310,881

CONDITIONAL TRANSFER CONTROL CIRCUIT

TECHNICAL FIELD

This invention relates to a conditional transfer control circuit and, more particularly, to a conditional transfer control circuit using either an EXCLUSIVE NOR gate or an EXCLUSIVE OR gate.

BACKGROUND OF THE INVENTION

In the prior art, there are logic circuits called EXCLUSIVE NOR gates and EXCLUSIVE OR gates. These gates provide logic functions which are useful for performing addition and subtraction operations.

Although these gates have well-known functions which are represented in truth tables, heretofore the gates are applied in a limited number of different logic arrangements. There exist some relatively complex logic arrangements, however, which may be simplified by the use of an EXCLUSIVE NOR gate or an EXCLUSIVE OR gate. The problem is discovering appropriate logic functions which can be performed by a simplified circuit using an EXCLUSIVE NOR gate or an EXCLUSIVE OR gate.

BRIEF DESCRIPTION OF THE INVENTION

This problem and others are solved with respect to a conditional transfer control circuit for a controller arranged for fetching instructions from a sequence of addresses wherein a list of instructions is stored, the conditional transfer control circuit including a circuit for producing a first signal representing a true or false condition resulting from executing an instruction in the list of instructions, a circuit for applying a second signal indicating whether control is determined by the first signal being true or the first signal being false, and an EXCLUSIVE NOR (or EXCLUSIVE OR) gate responsive to the first and second signals for providing a condition transfer signal that causes the controller to fetch a next subsequent instruction from an address other than the next subsequent address in the sequence of addresses wherein the list of instructions is stored.

BRIEF DESCRIPTION OF THE DRAWING

The aforementioned invention may be better understood by reading the following detailed description with reference to the attached drawing wherein.

DETAILED DESCRIPTION

Figure 1:
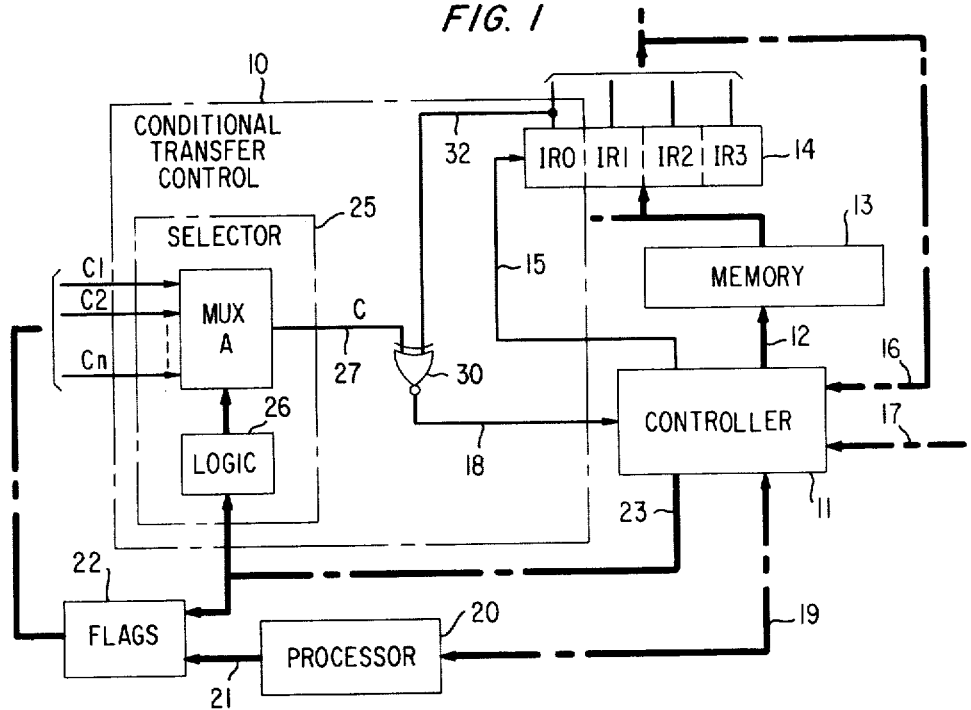
FIG. 1 is a combination of a logic schematic and block diagram of a conditional transfer control circuit.

Referring now to FIG. 1, a conditional transfer control circuit 10 is arranged for interacting with a controller 11, which is considered to include a programmable logic array (PLA) and a state counter connected in a loop configuration. Controller 11 applies signals by way of a bus 12 to a memory 13 for fetching instructions from a program stored in a sequence of addresses in the memory 13.

The program, or list of the instructions, is stored sequentially at addresses of the memory 13. Generally during operation, the controller fetches the instructions in the sequential order of the addresses wherein the list of instructions is stored. An exception is made to the order of fetching instructions when a transfer signal is applied to the controller. At that time, the controller commences to fetch the next instruction from an address other than the next sequential address in the sequence of addresses.

There is a set of operation codes (opcodes) each of which is a portion of an instruction. Each one of the instructions of the set is assigned one of the opcodes. The set of opcodes includes a subset of conditional transfer opcodes. In the subset of conditional transfer opcodes all of the opcodes are specially assigned for the purposes of the instant invention. Selections of conditional signals are dependent upon the specially assigned opcodes.

The opcode portion of each instruction is stored in an instruction register 14 in response to a control signal applied thereto from the controller 11 by way of a lead 15.

Controller 11 operates in response to many signals. Outputs of the instruction register are applied to the controller 11 by way of a cable 16. Other inputs to the controller are applied by way of additional leads, shown illustratively as cable 17. Additionally, a transfer control signal is applied from time to time as in input to the controller 11 by way of a transfer lead 18.

In response to the signals on the cables 16 and 17 and on the lead 18, the controller steps through a sequence of states and produces several output control signals which control the operation of a processor 20 and other circuits. Controller 11 produces output signals on a group of leads 19 for controlling the processor circuit 20, on the cable 12 for operating the memory and on a lead 15 for loading the instruction register 14. While the signal on the transfer lead 18 is low, the instructions are fetched in sequential order. At times when the signal on transfer lead 18 is high, the controller takes the next instruction from an address other than the next sequential address in the sequence of addresses.

As a result of arithmetic, logic, or bit manipulation functions performed by the processor 20, the processor from time to time generates condition signals, or flags, which are stored by way of cable 21 temporarily in the flag register 22. Flag register 22 is arranged to store each condition signal from the time it is generated until it is overwritten subsequently by another condition signal resulting from some instruction. Such condition signals may represent that a specific bit of the result from an operation of the processor is set or not set on a lead of the data bus, that the result from an operation of the processor has overflowed the circuits of the processor 20, that the result from an operation is zero or a negative value, or that a carry was generated. Storage of any condition signal in the flag register 22 is controlled by signals applied from the controller over a cable 23 to the flag register 22.

The flags stored in the register 22 produce bilevel condition signals C1, C2, ... Cn which are applied to inputs of a multiplexer MUX A in a condition signal selector arrangement 25. The designator n represents any positive integer greater than one. For the purpose of the description of the arrangement of FIG. 1, we assume the use of a signal convention wherein the signals C1 and C2 are a high level for representing a condition true and are a low level for representing a condition false. Also we assume that the signal Cn is a low level for representing a condition true and is a high level for representing a condition false. In other similar arrangements, a different and opposite signal convention can be adopted.

A logic circuit 26 included in the selector 25 applies a signal code, determined by the opcode of the instruction, to the multiplexer MUX A for determining which of the condition signals is transmitted through the multiplexer MUX A as a selected condition signal C on lead 27.

The selected condition signal C is applied to one input of an EXCLUSIVE NOR gate 30. Another input of the gate 30 is the signal applied over a lead 32 from the least significant bit position IR0 of the instruction register associated with the controller 12.

All opcode assignments for the conditional transfer opcodes are such that the input of the EXCLUSIVE NOR gate 30 which is received from the bit position IR0 is a low level, or zero, for transferring on condition false and is a high level, or a one, for transferring on condition true.

A condition transfer signal is generated on lead 18 as a high level which is applied, as previously mentioned, as an input to the controller 11. It causes the controller to fetch its next instruction from an address other than the next subsequent address in the sequence of addresses wherein the list of instructions is stored.

As previously suggested, these conditions for transfer may be inverted by those who wish to do so as long as they carefully consider output signal functions with respect to the applied input signals.

Figure 2:
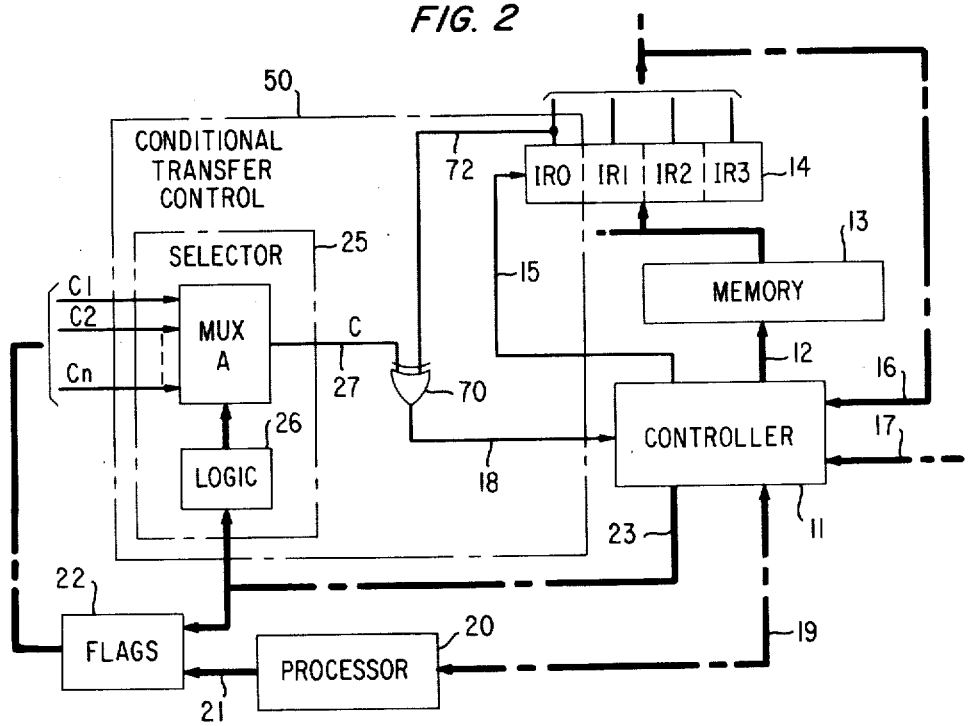
FIG. 2 is a combination of a logic schematic and block diagram of an alternative conditional transfer control circuit.

Referring now to FIG. 2, there is shown an alternative conditional transfer control circuit 50 which is arranged to operate similarly to the arrangement of the controller circuit 10 of FIG. 1. Circuit elements shown in FIG. 2 which are similar to the elements shown in FIG. 1 are identified by the same designators used in FIG. 1. A salient difference between the two circuits is that the circuit 50 includes an EXCLUSIVE OR gate 70 in place of the EXCLUSIVE NOR gate 30 included in FIG. 1.

Because of differences in the logic functions of the EXCLUSIVE NOR gate 30 and the EXCLUSIVE OR gate 70, some other differences are incorporated for assuring the desired operating characteristics. As in FIG. 1, the selected condition signal C is applied over lead 27 of the circuit 50 to one input of the EXCLUSIVE OR gate 70. The other signal applied over a lead 72 to the second input of the EXCLUSIVE OR gate 70 represents the least significant bit IR0 of the instruction stored in the instruction register 14. All opcode assignments for the conditional transfer opcodes are made so that this signal is a low level, or zero, for transfer on condition true and is a high level, or a one, for transfer on condition false.

In the arrangement of FIG. 2, the resulting condition transfer signal on lead 18 is a high level that is applied to the input of the controller 12. It causes the controller to fetch the next instruction from an address other than the next subsequent address in the sequence of addresses wherein the list of instructions is stored.

The aforementioned relatively simple logic circuits 10 and 50 can be directly substituted for a fairly complex programmable logic array (PLA) previously used for producing a condition transfer signal for digital processing. These simple logic circuits 10 and 50 reduce the amount of circuitry, require less integrated circuit chip area, help provide better chip yield and lower the cost of providing the conditional transfer operation. Additionally these simple random logic arrangements save data processing time because the operations they perform are not performed by programmable logic arrays which require a period of time during each operation for precharging lines. Since a precharging operation is not required by the simple random logic circuits described herein, the condition transfer signal can be produced without waiting through the time required for precharging. Saving time is particularly advantageous for a flag feedback arrangement wherein the flags are dependent upon the output of the controller.

The foregoing discussion describes the arrangement and operation of some embodiments of the invention. In view of the described embodiments, additional embodiments will be obvious to those skilled in the art. The embodiments described herein, together with those additional embodiments are considered to be within the scope of the invention.

I claim:

1. A conditional transfer control circuit (10) for a controller (11) arranged for fetching instructions from a sequence of addresses (in 13) wherein a list of instructions is stored, the conditional transfer control circuit BEING CHARACTERIZED BY a circuit (25) for producing a first signal (C) representing a true or false condition resulting from executing a current instruction in the list of instructions, a circuit (IR0) for applying a second signal (on lead 32 indicating whether control is determined by the first signal being true or by the first signal being false, and an EXCLUSIVE NOR gate (30) reponsive to the first and second signals for producing a condition transfer signal (on lead 18) that causes the controller to fetch a next subsequent instruction from an address other than the next subsequent address in the sequence of addresses wherein the list of instructions is stored.

2. A conditional transfer control circuit (50) for a controller (11) arranged for fetching instructions from a sequence of addresses (in 13) wherein a list of instructions is stored, the conditional transfer control circuit BEING CHARACTERIZED BY a circuit (25) for producing a first signal (C) representing a true or false condition resulting from executing a current instruction in the list of instructions, a circuit (IR0) for applying a second signal (on lead 72) indicating whether control is determined by the first signal being true or by the first signal being false, and an EXCLUSIVE OR gate (70) responsive to the first and second signals for producing a condition transfer signal (on lead 18) that causes the controller to fetch a next subsequent instruction from an address other than the next subsequent address in the sequence of addresses wherein the list of instructions is stored.

3. A conditional transfer control circuit, in accordance with either claim 1 or claim 2, wherein the circuit (IR0) applying the second signal applies a low level for transferring on the condition represented by the first signal being false and a high level for transferring on the condition represented by the first signal being true.

4. A conditional transfer control circuit, in accordance with claim 3, wherein the circuit (25) for producing the first signal includes a selector (MUX A) for selecting, as the first signal, a predetermined condition signal from a plurality of condition signals (C1 through Cn).

5. A conditional transfer control circuit, in accordance with either claim 1 or claim 2, wherein the circuit (IR0) applying the second signal applies a high level for transferring on the condition represented by the first signal being false and a low level for transferring on the condition represented by the first signal being true.

6. A conditional transfer control circuit, in accordance with claim 5, wherein the circuit (25) for producing the first signal includes a selector (MUX A) for selecting, as the first signal, a predetermined condition signal from a plurality of condition signals (Cl through Cn).

7. A conditional transfer control circuit, in accordance with either claim 1 or claim 2, wherein each instruction includes an opcode selected from a set of opcodes, the set including a subset of opcodes for conditional transfer instructions, all of the subset of opcodes assigned so that a specific bit of each conditional transfer instruction opcode applied as the second signal is a zero for transfer on the condition represented by the first signal being false and a one for transfer on the condition represented by the first signal being true.

8. A conditional transfer control circuit, in accordance with either claim 1 or claim 2, wherein each instruction includes an opcode selected from a set of opcodes, the set including a subset of opcodes for conditional transfer instructions, all of the subset of opcodes assigned so that a specific bit of each conditional transfer instruction opcode applied as the second signal is a one for transfer on the condition represented by the first signal being false and a zero for transfer on the condition represented by the first signal being true.

9. A conditional transfer control circuit, in accordance with either claim 1 or claim 2, wherein the circuit (25) for producing the first signal includes a selector (MUX A) for selecting, as the first signal, a predetermined condition signal from a plurality of condition signals (Cl through Cn).

10. A conditional transfer control circuit, in accordance with either claim 1 or claim 2, wherein the circuit (IR0) applying the second signal is a bit position of an instruction register, which applies a low level signal for transferring on the condition represented by the first signal being false and a high level for transferring on the condition represented by the first signal being true.

11. A conditional transfer control circuit, in accordance with claim 10, wherein the circuit (25) for producing the first signal includes a selector (MUX A) for selecting, as the first signal, a predetermined condition signal from a plurality of condition signals (Cl through Cn).

12. A conditional transfer control circuit, in accordance with either claim 1 or claim 2, wherein the circuit (IR0) applying the second signal is a bit position of an instruction register, which applies a high level signal for transferring on the condition represented by the first signal being false and a low level for transferring on the condition represented by the first signal being true.

13. A conditional transfer control circuit, in accordance with claim 12, wherein the circuit (25) for producing the first signal includes a selector (MUX A) for selecting, as the first signal, a predetermined condition signal from a plurality of condition signals (Cl through Cn).

* * * * *